Aug. 25, 1953     J H. HUNT     2,649,820
APPARATUS FOR PRODUCING TAPERED METAL DISKS
Filed Nov. 25, 1947     2 Sheets-Sheet 1

Inventor
J HAROLD HUNT

Aug. 25, 1953 J H. HUNT 2,649,820
APPARATUS FOR PRODUCING TAPERED METAL DISKS
Filed Nov. 25, 1947 2 Sheets-Sheet 2

Inventor
J HAROLD HUNT
By Barnes, Kisselle, Laughlin & Raisch
Attorneys.

Patented Aug. 25, 1953

2,649,820

UNITED STATES PATENT OFFICE 2,649,820

APPARATUS FOR PRODUCING TAPERED METAL DISKS

J Harold Hunt, Lansing, Mich., assignor to Motor Wheel Corporation, Lansing, Mich., a corporation of Michigan Application November 25, 1947, Serial No. 788,054

4 Claims. (Cl. 78—17)

This invention relates to an apparatus for producing a tapered metal disk and more particularly to a tapered steel vehicle wheel disk.

This invention contemplates an apparatus for producing a tapered metal disk which is uniformly tapered from the center outwardly.

It is an object of this invention to produce such a machine which is of simple structure, reliable and efficient in operation.

These objects are accomplished in general by placing a flat disk between a flat platen and a tapered platen with a spiral projection thereon which upon rotation causes the metal of the disk to flow from the center toward the outer periphery of the disk to thereby taper the same.

Figure 1:
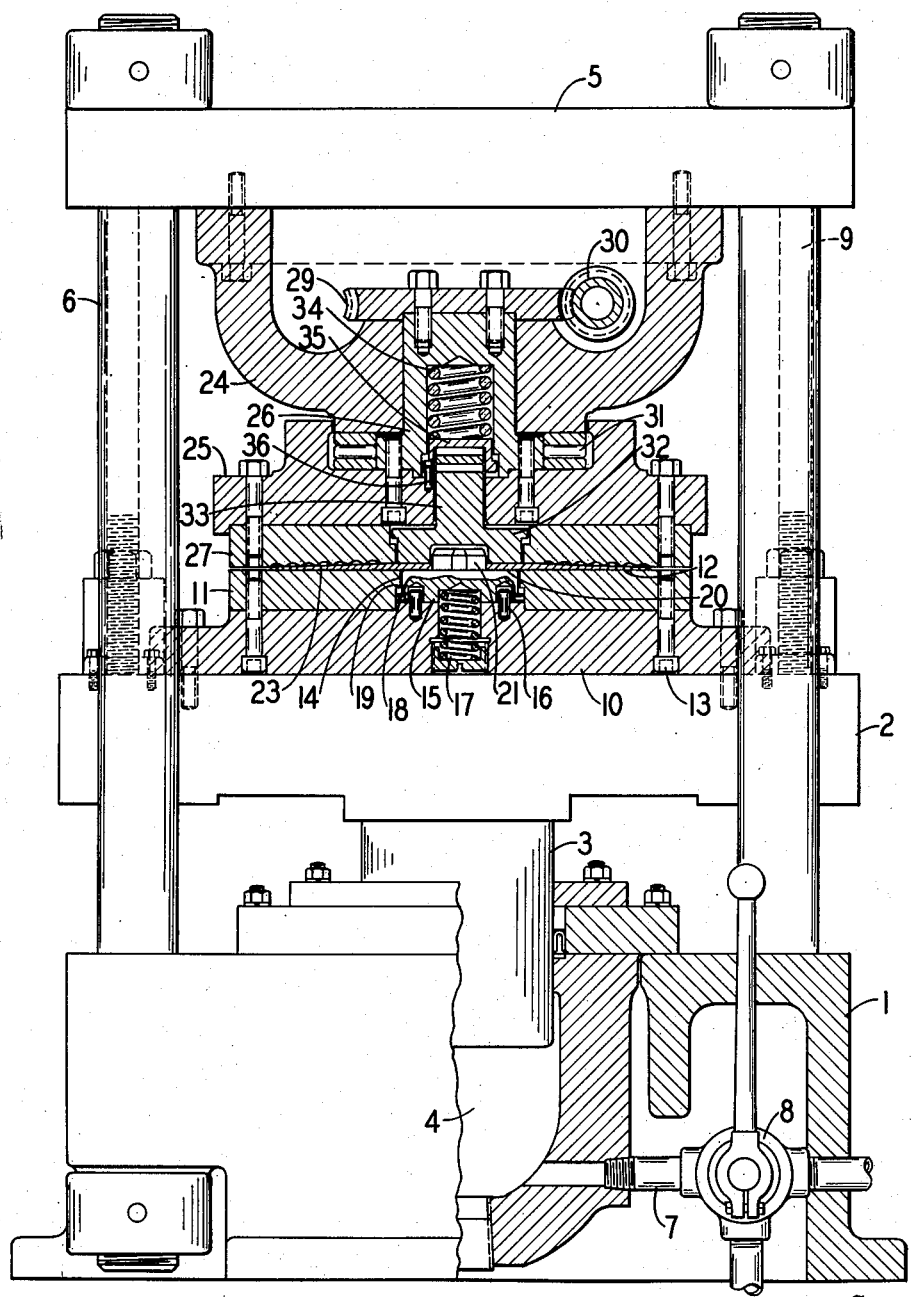
Fig. 1 is an elevation partly in vertical section showing my machine for producing tapered disks.

My apparatus comprises a hydraulic press having a base 1, a movable head 2 supported on piston 3 which is reciprocably mounted in cylinder 4, a fixed head 5 supported upon the base 1 by a plurality of posts 6. Liquid under pressure is admitted to, and discharged from, cylinder 4 through pipe line 7 controlled by two-way valve 8. Upward movement of movable head 2 is limited by the stop members 9 which in the uppermost position of head 2 abut against the underside of fixed head 5.

The tapering mechanism comprises a base 10 which is secured by bolts to movable head 2. Platen 11, having a flat upper face 12, is secured by bolts 13 upon base 10. Platen 11 is provided with a central opening 14. A disk support 15 is mounted upon base 10 and keyed thereto by a plurality of dowel pins 16 which permit movement of disk support 15 upwardly and downwardly with respect to base 10 but key the same against rotation upon base 10. A compression spring 17 normally holds disk support 15 upwardly in a position where the circumferential flange 18 abuts undercut shoulder 19 so that the upper face 20 of disk support 15 will be above the flat face 12 of platen 11. Pilot 21, integral with disk support 15, is shaped to conform to the contour of opening 22 in disk 23, which is to be tapered, so that the disk cannot rotate relative to platen 11.

Figure 2:
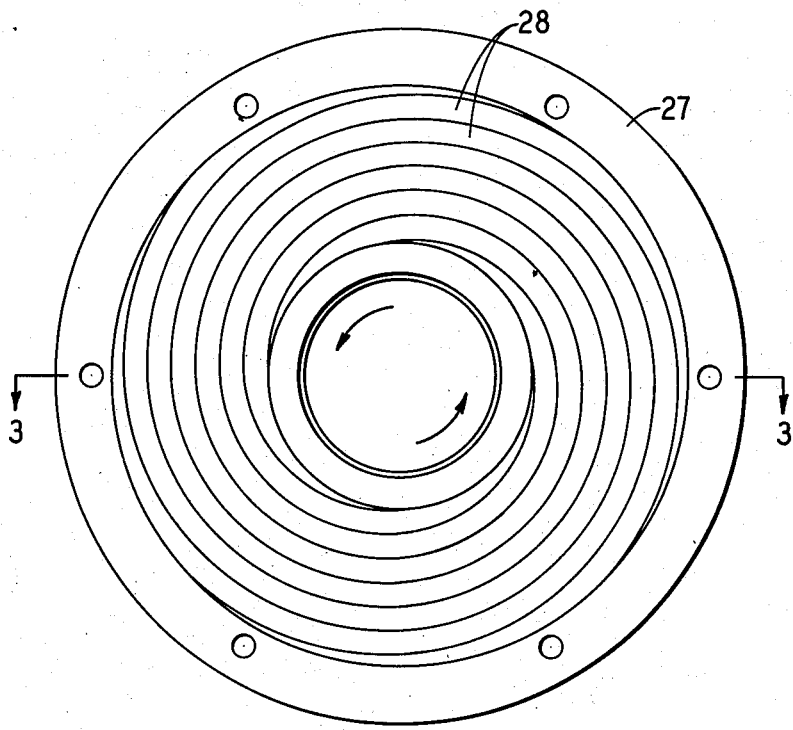
Fig. 2 is a plan view of the platen with the spiral projections looking on the side on which the projections are located.
Figure 3:
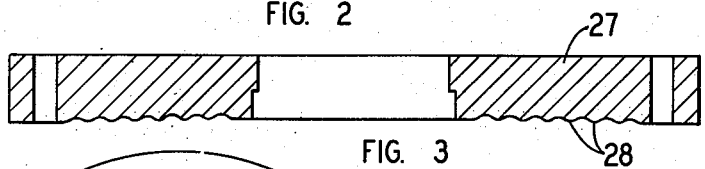
Fig. 3 is a section along the line 3—3 of Fig. 2.
Figure 4:
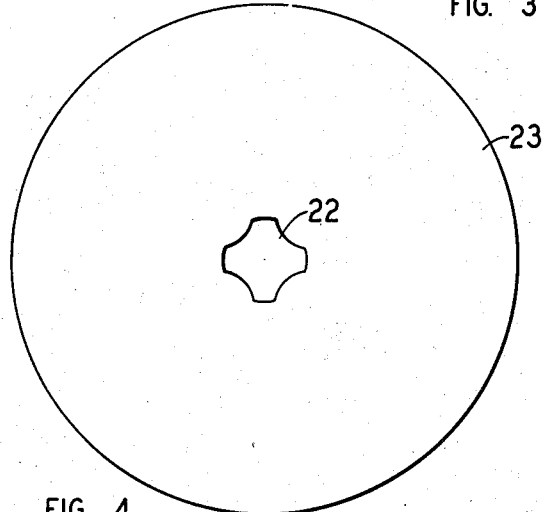
Fig. 4 is a plan view of the disk before rolling.

A fixed frame 24 is secured by bolts to stationary head 5. A rotating plate 25 is secured by bolts to shaft 26 which is journalled in frame 24. Platen 27 is secured by bolts to plate 25. The lower face of platen 27 is concave. Either the lower face of platen 27 or the flat face 12 of platen 11 should be provided with spiral ribs. For purposes of description platen 27 is provided with a plurality of spiral ribs 28. Each spiral rib 28 has its axis concentric with the center of the platen 27. The direction of rotation of platen 27 and ribs 28 is indicated by the arrows Fig. 2.

A worm gear 29 is secured by bolts to the upper end of shaft 26 and worm gear 29 is driven by worm 30 which is preferably driven by a motor (not shown). Axial thrust between plate 25 and frame 24 is taken up by roller bearing 31. A pressure member 32 having a stem 33 is mounted in central openings in platen 27 and plate 25 and normally urged downwardly by a compression spring 34. Compression spring 34 acts through a pressure plate 35 keyed to plate 25 by pin 36 to apply pressure upon the upper end of stem 33. Stem 33 is journalled in a central opening in plate 25 for both up and down movement and rotary movement therein, and similarly pressure plate 32 is mounted in a central opening in platen 27 for up and down movement and also rotary movement therein.

Figure 5:
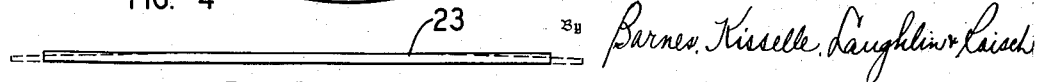
Fig. 5 is an edge view showing the disk before rolling in full lines and the form of the disk after rolling in dotted lines.

The operation of my device is as follows: Disk 23, which by way of illustration, is a steel disk, is of uniform thickness, Fig. 5. Disk 23 while hot and while platen 27 is elevated above and spaced from stationary platen 11, is positioned upon disk support 15 with pilot 21 projecting through opening 22 in disk 23 and thereby locking disk 23 against rotation upon platen 11. Disk support 15 holds the hot disk 23 above platen 11 until the tapering operation begins and thereby avoids too rapid cooling of the hot disk. If the hot disk could contact throughout its lower face with the upper face 12 of platen 11 before the tapering step began, it would lose its heat too rapidly and would cool before the tapering operation could be finished. It should be noted that the lower face of platen 27 with the spiral corrugations therein is concave, that is, it tapers uniformly from the center of the platen downwardly toward the circumference thereof.

When head 25 is raised, then the lower face of platen 32 projects below the corrugated face of platen 27. As the hydraulic press is operated to lower platen 27, plate 32 will first contact the upper face of the disk 23 to be corrugated and this disk will now be held between members 32 and 15 and between the thrust of springs 34 and 17. Plate 32 will rotate with plate 25 and platen 27 until plate 32 contacts the disk which is held stationary upon platen 11. When plate 32 contacts the disk, it will cease rotating but plate 25 and platen 27 will continue their rotation. The rotation of platen 27 and plate 25 can be continuous or can be initiated as soon as platen 27 contacts disk 23. The valve 8 is actuated so that the hydraulic press closes thereby bringing the platens together and applying considerable pressure upon the hot disk 23. The rotary action of the spiral projections 28 on platen 27 causes the hot metal of disk 23 to flow toward the outside periphery of the disk. The radial outer portions of the spiral ribs 28 will contact the disk first and as the platens come closer together the contact will move progressively inwardly toward the center of the disk. As platen 27 rotates or spins upon hot disk 23, spiral projections cause the metal to flow radially outwardly thereby tapering the disk 23 uniformly from the center radially outwardly to the periphery, as shown in the dotted lines Fig. 5.

I claim:

1. In an apparatus for tapering a metal disk, a pair of platens, the one platen being adapted to support the disk to be tapered, means for holding said disk against rotation upon said last mentioned platen, the other platen having a tapered face adapted to press against said disk to be tapered, said tapered face being tapered from its center axially toward the face of said other platen, the face of one of said platens having at least one spiral projection emanating from substantially the center of said platen, and said spiral having its center concentric with the center of the disk, means for pressing said platens together, means for rotatably supporting one of said platens on an axis substantially perpendicular to said platen faces, and means for rotating said one platen relative to the other while said platens are pressed together whereby as the metal disk is pressed between the said platens and the one platen is rotated relative to the other, the spiral projection will flow the metal of said disk radially outwardly and thereby taper the same.

2. The combination as set forth in claim 1 wherein the face of the platen which supports the disk is a plane surface, and a yieldable support for said disk normally projecting above the plane surface of said platen to thereby support the disk above the plane surface of said platen when the platens are separated.

3. In an apparatus for tapering a metal disk, a pair of platens adapted to receive therebetween the metal disk which is to be tapered, the face of one of said platens having at least one spiral projection having its axis concentric with the center of the platen, means for holding said disk against rotation upon the other of said platens, one of said platens having a tapered face adapted to press against said disk, said tapered face being tapered from its center axially toward the face of said other platen, means for pressing said platens together, means for rotatably supporting one of said platens on an axis substantially perpendicular to said platen faces, and means for rotating said one platen relative to the other while said platens are pressed together whereby as the metal disk is pressed between the said platens and the one platen is rotated relative to the other, the spiral projection will flow the metal of said disk radially outwardly and thereby taper the same.

4. The combination as set forth in claim 3 wherein the face of one of said platens is a plane surface and the platens are mounted upon a common axis in planes perpendicular to said axis.

J HAROLD HUNT.

References Cited in the file of this patent

UNITED STATES PATENTS

| Number | Name | Date |
| --- | --- | --- |
| 172,443 | Ide | Jan. 18, 1876 |
| 921,739 | Rieske | May 18, 1909 |
| 1,052,193 | Vogt | Feb. 4, 1913 |
| 1,647,853 | Budd | Nov. 1, 1927 |